United States Patent [19]
Kato et al.

[11] Patent Number: 5,258,442
[45] Date of Patent: Nov. 2, 1993

[54] POLYPHENYLENE SULFIDE RESIN COMPOSITION

[75] Inventors: Toshikazu Kato; Yasuhisa Ogita; Kensuke Ogawara, all of Mie, Japan

[73] Assignees: Tosoh Corporation, Yamaguchi; Toso Susteel Co., Ltd., Tokyo, both of Japan

[21] Appl. No.: 943,160

[22] Filed: Sep. 10, 1992

Related U.S. Application Data

[63] Continuation of Ser. No. 821,285, Jan. 10, 1992, abandoned, which is a continuation of Ser. No. 606,256, Oct. 31, 1990, abandoned.

[30] Foreign Application Priority Data

Oct. 31, 1989 [JP] Japan .................. 1-281809

[51] Int. Cl.$^5$ .................. C08K 3/26; C08L 81/00
[52] U.S. Cl. .................. 524/425; 524/609; 524/611
[58] Field of Search .................. 524/425, 609, 611; 523/210

[56] References Cited

U.S. PATENT DOCUMENTS

| | | | |
|---|---|---|---|
| 4,017,450 | 4/1977 | Bailey | 524/424 |
| 4,115,344 | 9/1978 | Brady | 524/100 |
| 4,370,292 | 1/1983 | Yanase et al. | 525/539 |
| 4,395,512 | 7/1983 | Kubota et al. | 524/425 |
| 4,529,769 | 7/1985 | Johnson et al. | 524/425 |
| 4,748,169 | 5/1988 | Izutsu et al. | 524/504 |
| 4,886,705 | 12/1989 | Sakamoto | 524/401 |
| 4,917,957 | 4/1990 | Nitoh et al. | 524/262 |
| 4,918,134 | 4/1990 | Kato et al. | 524/425 |
| 4,933,386 | 7/1990 | Nitoh et al. | 524/425 |
| 4,952,624 | 8/1990 | Köhler et al. | 524/160 |

FOREIGN PATENT DOCUMENTS

| | | | |
|---|---|---|---|
| 0061000 | 5/1977 | Japan | 524/425 |
| 59-181408 | 10/1984 | Japan . | |
| 0148567 | 7/1987 | Japan | 524/425 |
| 0151462 | 7/1987 | Japan | 524/425 |
| 0175064 | 7/1988 | Japan | 524/425 |
| 0213560 | 9/1988 | Japan | 524/425 |
| 0260929 | 10/1988 | Japan | 524/425 |
| 0081855 | 3/1989 | Japan | 524/425 |
| 0151656 | 6/1990 | Japan | 524/425 |
| 0196858 | 8/1990 | Japan | 524/425 |

Primary Examiner—Paul R. Michl
Assistant Examiner—Peter Szekely
Attorney, Agent, or Firm—Sughrue, Mion, Zinn, Macpeak & Seas

[57] ABSTRACT

There is disclosed a polyphenylene sulfide resin composition which comprises: (a) 100 parts by weight of a polyphenylene sulfide resin; and (b) from about 0.1 to about 10 parts by weight of finely divided calcium carbonate having a mean particle size of less than about 0.5 μm and a BET surface area of greater than about 15 m$^2$/g. The resin composition is improved in that it exhibits no or little corrosive action on metals and that it shows excellent mechanical strength.

11 Claims, No Drawings

POLYPHENYLENE SULFIDE RESIN COMPOSITION

This is a continuation of application Ser. No. 07/821,285 filed Jan. 10, 1992, which is a continuation of prior application Ser. No. 07/606,256 filed Oct. 31, 1990 (both now abandoned).

This invention relates to a polyphenylene sulfide resin composition improved in that the composition exhibits a less corrosive action on metals.

Polyphenylene sulfide resin has high resistance to heat and chemicals and use of it in electrical and electronic parts as well as automotive parts is drawing attention of researchers. This polymer find extensive use in applications where resistance to heat and chemicals is required.

For the purposes of the maintenance of electrical insulation properties, the mechanical protection and the prevention of variation of characteristics caused by environmental atmosphere, of various electronic elements, such as IC, LSI, transistors, diodes, thyristors, condensers, thermistors and the like and of composite parts consisting of these elements, polyphenylene sulfide (referred to as PPS hereinafter) has been used to coat or encapsulate the elements or parts.

Upon exposure of the coated or encapsulated elements or parts to raised temperatures, however, corrosive gases tend to be generated from the covering PPS resin and thus to corrode metallic components such as electrode, lead, or lead framing. This corrosion problem is a barrier to apply shaped products of PPS resin to the electrical and electronic field, in particular where the shaped products are used in contact with metals.

In order to improve PPS with respect to the corrosion drawback, various additives have been proposed for reducing the corrosive properties of PPS resin.

For example, U.S. Pat. No. 4,017,450 teaches addition of carbonates, silicates and hydroxides of alkali metals to PPS resin. However, this approach does not seem to be satisfactory and presents an additional problem that the electrical and electronic characteristics are adversely affected. Further, though lithium carbonate shows a relatively good performance, it is expensive and presents an economic problem and it has an adverse effect on the mechanical properties of the product.

U.S. Pat. No. 4,115,344 teaches addition of ureas, hydrazines and amino-acids. However, these nitrogen compounds tend to degrade or decompose at temperatures at which PPS resin together with the additive compounds is processed. This degradation tendency gives rise to a poor effect of addition and, rather, results in a problem of increased gas evolution.

Our intensive studies of the above difficulties have shown that addition of calcium carbonate of specific characteristics to PPS resin is effective for improving the resin with respect to the undesirable corrosive action on metals and, thus, have resulted in the present invention.

Accordingly, the invention provides a polyphenylene sulfide resin composition which comprises 100 parts by weight of a polyphenylene sulfide resin and from about 0.1 to about 10 parts by weight of finely divided calcium carbonate having a mean particle size of less than about 0.5 μm and a BET surface area of greater than about 15 m²/g.

FIG. 1 shows a schematic sectional view of a test apparatus in which the corrosive properties of the PPS resin composition were assessed.

The invention will be described in more detail hereinafter.

The term "PPS resin" used herein includes a homopolymer and copolymers comprising a recurring unit of the formula:

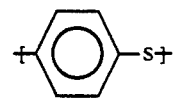

in a proportion of at least 70 mole % and preferably at least 90 mole %. The resin may be partly cross-linked. The units of comonomer or comonomers which may be present in the copolymers include, for example,

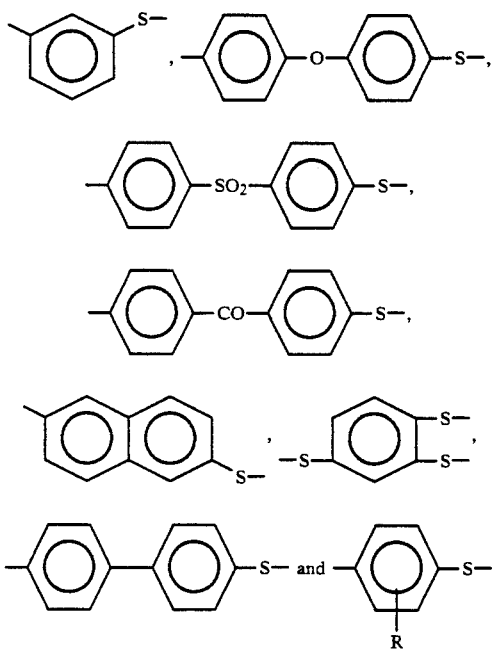

where R is alkyl, phenyl, nitro, carboxyl, nitrile, amino, alkoxyl, hydroxyl or sulfone group.

The finely divided calcium carbonate material used in the present invention is one that has a mean particle size of less than about 0.5 μm, preferably less than 0.1 μm and a BET surface area of greater than about 15 m²/g, preferably greater than 25 m²/g.

Where the mean particle size is greater than about 0.5 μm or the BET surface area is less than about 15 m²/g, the effect of decreasing the corrosive action of resin on metals is poor.

The calcium carbonate material may be subjected to surface-treatment, for example, with resin acids or lignins or the like, in order to improve the dispersibility of calcium carbonate in the resin.

The content of finely divided calcium carbonate in the polymer composition according to the invention ranges from about 0.1 to about 10 parts, preferably from 0.5 to 5 parts by weight per 100 parts by weight of PPS resin. Where the content of calcium carbonate is less than 0.1 part by weight per 100 parts by weight of PPS resin, the corrosive action of the resin on metals may not be decreased to an acceptable extent, while if the content of calcium carbon is increased to a level of greater than 10 parts by weight on the same basis, then the mechanical strength properties of the resin may be adversely affected. Therefore, the contents of calcium carbonate less than about 0.1 part and greater than about 10 parts by weight are not suitable for the purpose of the present invention.

The PPS resin composition may contain various fillers. Examples of the fillers which may be used include fibrous fillers such as glass fibers, carbon fibers, ceramic fibers and metallic fibers; whiskers, for example of potassium titanate; and powdery fillers such as mica, calcium carbonate, silica, talc, calcium sulfate, kaolin, clay, glass powder and glass beads, which may be incorporated alone or in combination.

The present resin composition, if necessary, may contains conventionally used additives such as a plasticizer, mold release agent, silane or titanate-based coupling agent, lubricant, heat stabilizer, weathering agent, nucleating agent, forming agent, ion-trapping agent, and flame retardant.

Further, if necessary, the present PPS resin composition may contain various thermosetting and thermoplastic resins either alone or as admixtures. Examples of the resins include epoxy resins, cyanate ester resins, phenol resins, polyimide resins, silicone resins, polyester resins, nylons, polyphenylene oxides, polycarbonates, polysulfones, polyethersulfones, polyetherketones, polyetheretherketones, polyphenylenesulfide sulfones, polyphenylenesulfide ketones and fluoroplastics, which may be homopolymers, or random or block graft copolymers.

The PPS resin composition of the present invention may be prepared by any suitable hot melt blending technique. For example, the components of the composition may be first mixed in a blender such as a V-blender or Henschel mixer and then hot-melt-blended in a kneader, a mill or a single or twin screw extruder.

The resulting composition may be molded into articles using, for example, an injection, extrusion, transfer or compression molding machine.

EXAMPLE

The invention will be described further in detail by the following non-limiting Examples.

REFERENCE EXAMPLE

Preparation of PPS resin

A PPS resin was prepared by the following procedure and used in the Examples below.

A reactor of a volume of 530 l and provided with a stirrer, a water removing column and a temperature controlling jacket was charged with 110 l of N-methyl pyrrolidone and 61.1 kg of sodium sulfide (60 wt % purity as $Na_2S$) and heated by the jacket with stirring to remove water from the contents through the water removing column until a temperature of about 200° C. was achieved within the reactor. By this heating, 13.5 l of a distillate comprising mainly of water was removed. Thereafter, p-dichlorobenzene (70.0 kg) and N-methyl pyrrolidone (48 l) were added and heated to 250° C. The reaction mixture was allowed to react for 3 hours at 250° C.

After this period of time, the reaction mixture was passed into a solvent recovery unit provided with a stirrer, a jacket and a vacuum line. Prior to introduction of the reaction mixture into the solvent recovery unit, an additional amount of N-methyl pyrrolidone (30 l) was added to the mixture. Then the reaction mixture was heated under a reduced pressure to distil off 210 l of a fraction comprising mainly of N-methyl pyrrolidone. Into the residual reaction mixture, 200 l of water was added to form an aqueous slurry, which was then heated to 80° C. for 15 minutes with stirring and, thereafter, subjected to centrifugal separation to give a crude polymer product.

The resulting polymer product was returned to the solvent recovery unit and 200 l of water added. The mixture was heated at 100° C. for 30 minutes with stirring. After cooling, a powdery polymer was recovered from the aqueous mixture by centrifugal separation.

This purifying procedure was further repeated twice.

The resulting polymer was dried in a jacketed ribbon blender.

A sample of the polymer showed a melt viscosity of 27 Pa.s as measured in a KOHKA-type-flow tester having a die of a 0.5 mm diameter and a 2 mm length at 300° C. under a weight of 10 kg.

The polymer was allowed to cure at 250° C. for 4 hours while tumbling the polymer in an air stream within a ribbon blender. The thus treated polymer exhibited a melt viscosity of 280 Pa.s.

EXAMPLE 1

A sample (3.0 kg) of the PPS resulting from the preceding Reference Example was blended with 2.1 kg of chopped strand of glass fibers (diameter: 13 μm, cut length: 3 mm) and 51 g of finely divided calcium carbonate having a mean particle size of 0.05 μm and a BET surface area of 34 $m^2/g$ (a commercially available product from Shiraishi Kogyo Co., Ltd.) in a V-blender. The mixture was melt-extruded through a twin screw extruder (45 mm, L/D=30) to give pellets of the resin composition.

A sample of the pelletized resin composition 5 was weighed 10 g into a weighing bottle 2 as shown in FIG. 1. Silver specimens 4 (25×25×0.2 mm) were laid in a Petri dish 3 which was placed in the weighing bottle 2 containing the weighed samples of pellets 5. This assembly was heated at 150° C. for a period of 500 hours in an oven 1. Any corrosion of the silver specimens was observed visually and the lightness index (L) was determined by means of a lightness difference meter (manufactured by Suga Shikenki Co., Ltd.) No discolation was observed on the specimens. A lightness index (L) of 26 was determined.

For comparison, a similar heating test was conducted with omitting the resin composition. In this comparative test, the silver specimens showed a lightness index of 24.

The effect of the addition of finely divided calcium carbonate on the mechanical strength of the resin composition was assessed by determining the flexural strength of the resin composition in accordance with the method of ASTM D790. The flexural strength was found to be 250 MPa.

COMPARATIVE EXAMPLE 1

The procedure of Example 1 was repeated except that the finely divided calcium carbonate was omitted.

The silver specimens were discolored to grayish white. The lightness index was as high as 45. The flexural strength of the composition was 250 MPa.

COMPARATIVE EXAMPLE 2

The procedure of Example 1 was repeated except that 50 g of lithium carbonate (a guaranteed reagent available from Wako Junyaku Kogyo Co., Ltd.) was used in place of the finely divided calcium carbonate.

The silver specimens were slightly discolored to grayish white and a lightness of 33 was observed.

The flexural strength of this comparative composition was 235 MPa, indicating a decrease in the mechanical strength due to the addition of lithium carbonate.

EXAMPLES 2-6

The procedure of Example 1 was repeated using various finely divided calcium carbonate materials of different particle sizes and BET surface areas.

The results are shown in Table 1.

COMPARATIVE EXAMPLES 3 AND 4

The procedure of Example 1 was repeated except that a coarse calcium carbonate (a particle size of 4 μm and a BET surface area of 1.2 m²/g) conventionally used as a filler for PPS was employed in different proportions.

The results are shown in Table 1.

COMPARATIVE EXAMPLES 5 AND 6

The procedure of Example 1 was repeated using calcium carbonate materials that were finely divided but fell outside the scope of the present invention.

The results are shown in Table 1.

TABLE 1

| | Resion compositions | | | | | Corrosion of silver specimen[1] | | Mechanical characteristics |
|---|---|---|---|---|---|---|---|---|
| | PPS (p.b.w.) | Glass fibers (p.b.w.) | Calcium carbonate | | | Visual obser-vation[2] | Light-ness index[3] (L) | Flexural strength (MPa) |
| | | | particle size (μm) | BET surface area (m²/g) | p.b.w. | | | |
| Ex. | | | | | | | | |
| 2 | 100 | 67 | 0.07 | 17 | 1.7 | ◯ | 31 | 245 |
| 3 | 100 | 67 | 0.04 | 26 | 1.7 | ◯ | 29 | 250 |
| 4 | 100 | 67 | 0.03 | 51 | 1.7 | ◯ | 26 | 250 |
| 5 | 100 | 67 | 0.03 | 51 | 0.8 | ◯ | 28 | 250 |
| 6 | 100 | 67 | 0.03 | 51 | 3.3 | ◯ | 25 | 245 |
| Comp. Ex. | | | | | | | | |
| 3 | 100 | 67 | 4.0 | 1.2 | 1.7 | X | 44 | 235 |
| 4 | 100 | 67 | 4.0 | 1.2 | 10 | Δ | 37 | 210 |
| 5 | 100 | 67 | 1.0 | 14 | 1.7 | Δ | 38 | 230 |
| 6 | 100 | 67 | 0.15 | 12 | 1.7 | Δ | 38 | 235 |

[1] Conditions of silver specimen corrosion test: with 10 g of resin pellets at 150° C. for 500 hours
[2] Visual observation: ◯: no discoloration, Δ: slightly discolored to grayish white, X: discolored to grayish white
[3] Lightness index: measured by a lightness difference meter (where the silver brightness of the specimen is lost and the specimen is discolored to grayish white, then the value of L becomes greater)

As can been seen from the above description, the present PPS resin composition is improved in that it exhibits no or little corrosive action on metals and that it shows excellent mechanical strength. Therefore, the invention is significantly valuable in industry.

What is claimed is:

1. A polyphenylene sulfide resin composition suitable for encapsulating or coating parts containing metallic components, which resin composition comprises (a) 100 parts by weight of a polyphenylene sulfide resin with (b) from about 0.1 to about 10 parts by weight of finely divided calcium carbonate having a mean particle size of less than about 0.5 μm and a BET surface area of greater than about 15 m²/g.

2. A resin composition as claimed in claim 1 wherein said calcium carbonate has a mean particle size of less than 0.1 μm and a BET surface area of greater than 25 m²/g.

3. A resin composition as claimed in claim 1 wherein said calcium carbonate is present in a proportion of about 0.5-5 parts by weight.

4. A resin composition as claimed in claim 1 wherein said calcium carbonate has been subjected to surface-treatment with a resin acid or a lignin.

5. A resin composition as claimed in claim 1 wherein the polyphenylene sulfide resin is a homopolymer containing a plurality of repeating units of the general formula:

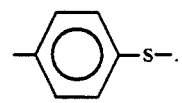

6. A resin composition as claimed in claim 1 wherein the polyphenylene sulfide resin is a copolymer comprising at least 70 mole % of repeating units of the general formula:

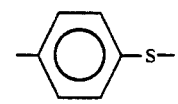

and at least one other comonomer.

7. A resin composition as claimed in claim 6 wherein the units of other comonomer have a structure selected from the group consisting of:

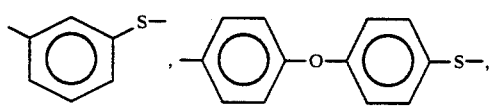

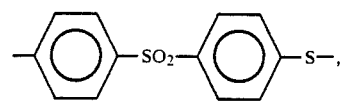

-continued

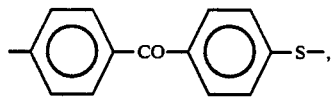

-continued

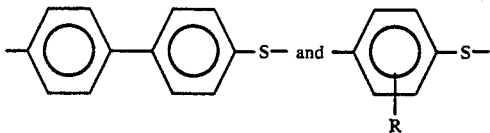

where R is alkyl, phenyl, nitro, carboxyl, nitrile, amino, alkoxyl, hydroxyl or sulfone group.

8. A resin composition as claimed in claim 1 wherein said resin composition further comprises one or more filling agents.

9. A resin composition as claimed in claim 2 wherein said calcium carbonate is present in a proportion of about 0.5-5 parts by weight.

10. A resin composition as claimed in claim 2 wherein said calcium carbonate has been subjected to surface-treatment with a resin acid or a lignin.

11. A resin composition as claimed in claim 3 wherein said calcium carbonate has been subjected to surface-treatment with a resin acid or a lignin.

* * * * *